Feb. 22, 1944.  H. R. FOWLER  2,342,336
ELECTRIC CONVERSION
Filed July 16, 1941  3 Sheets-Sheet 1
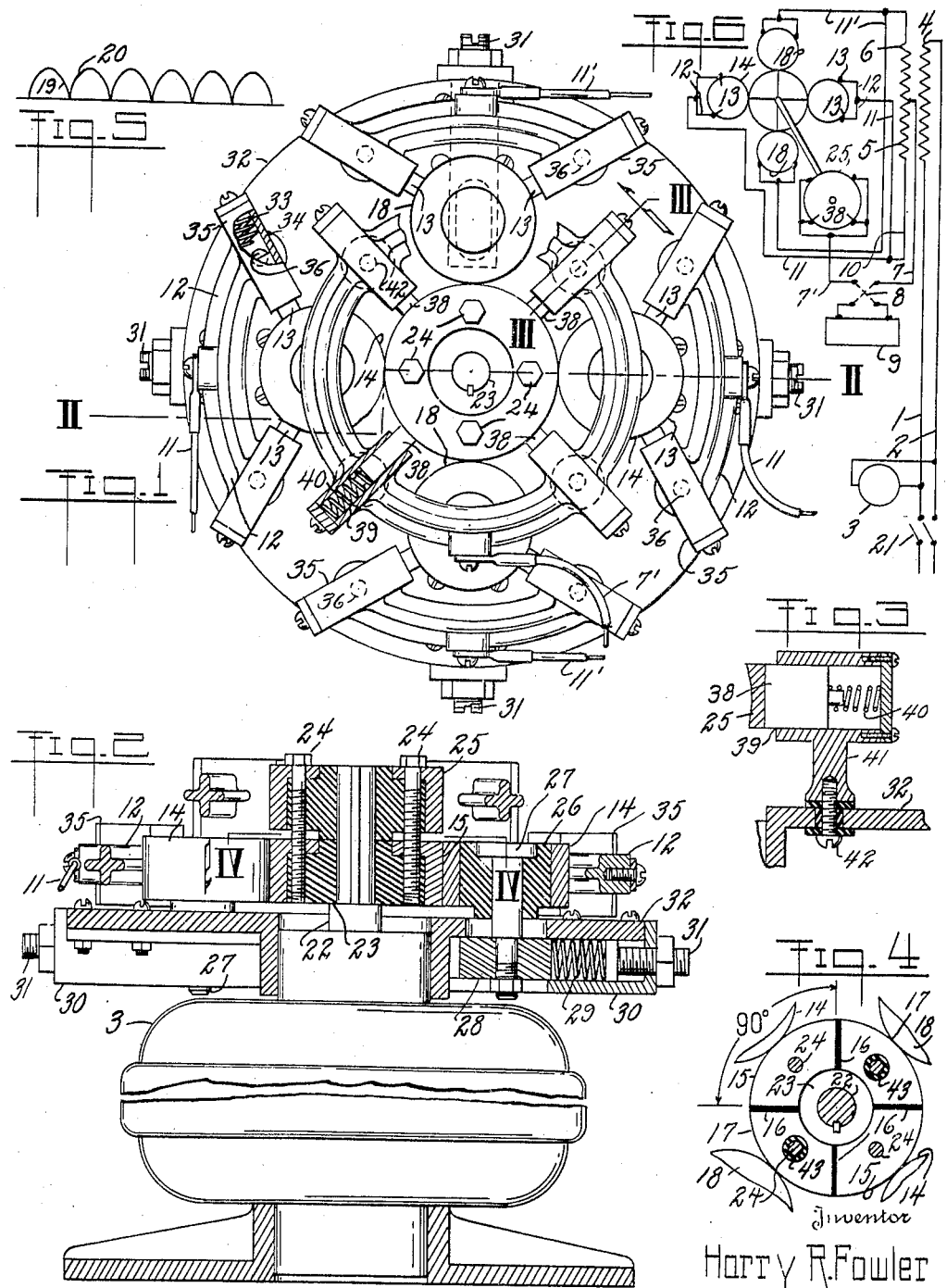
Inventor
Harry R. Fowler
By
Attorney

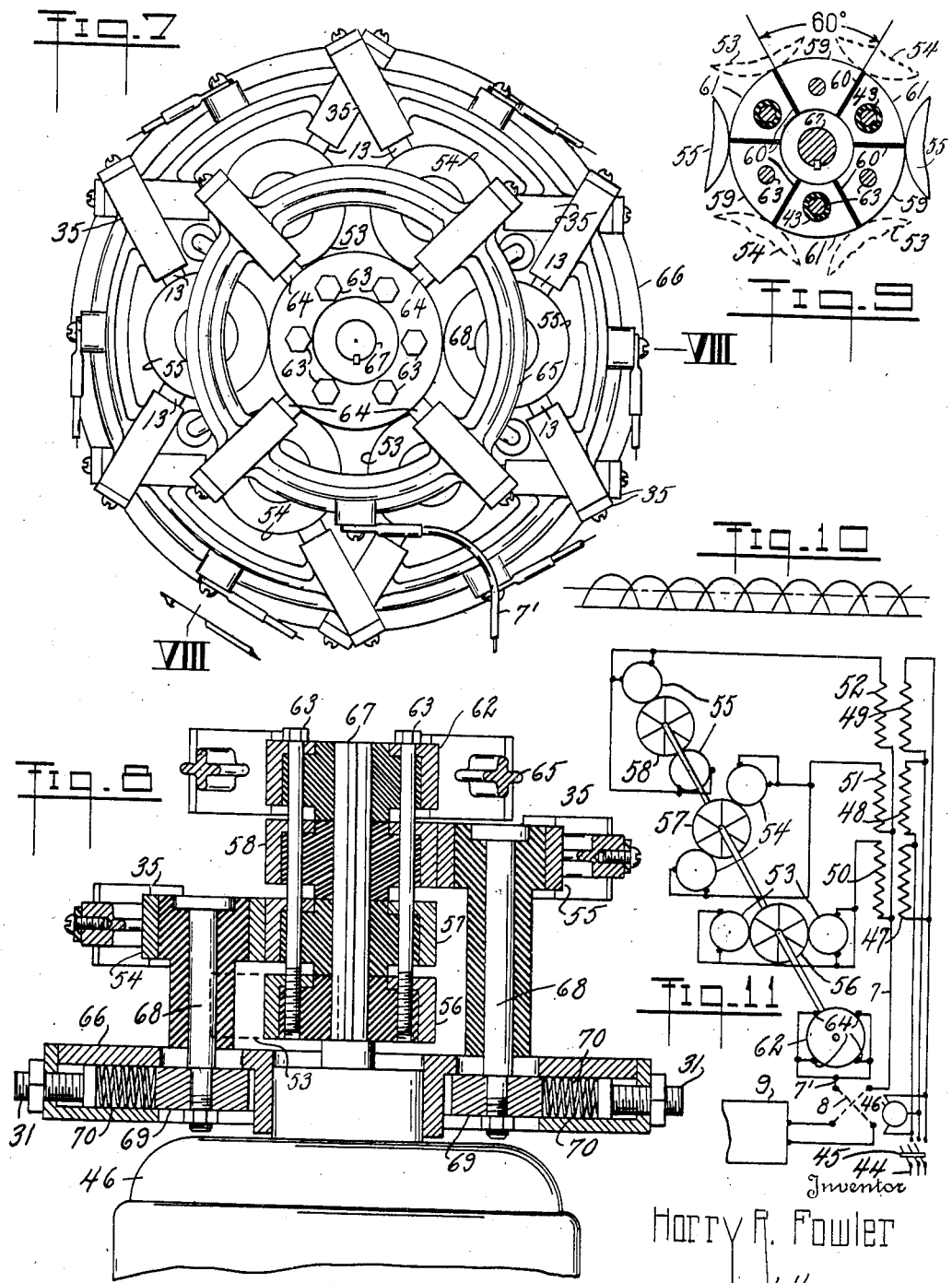

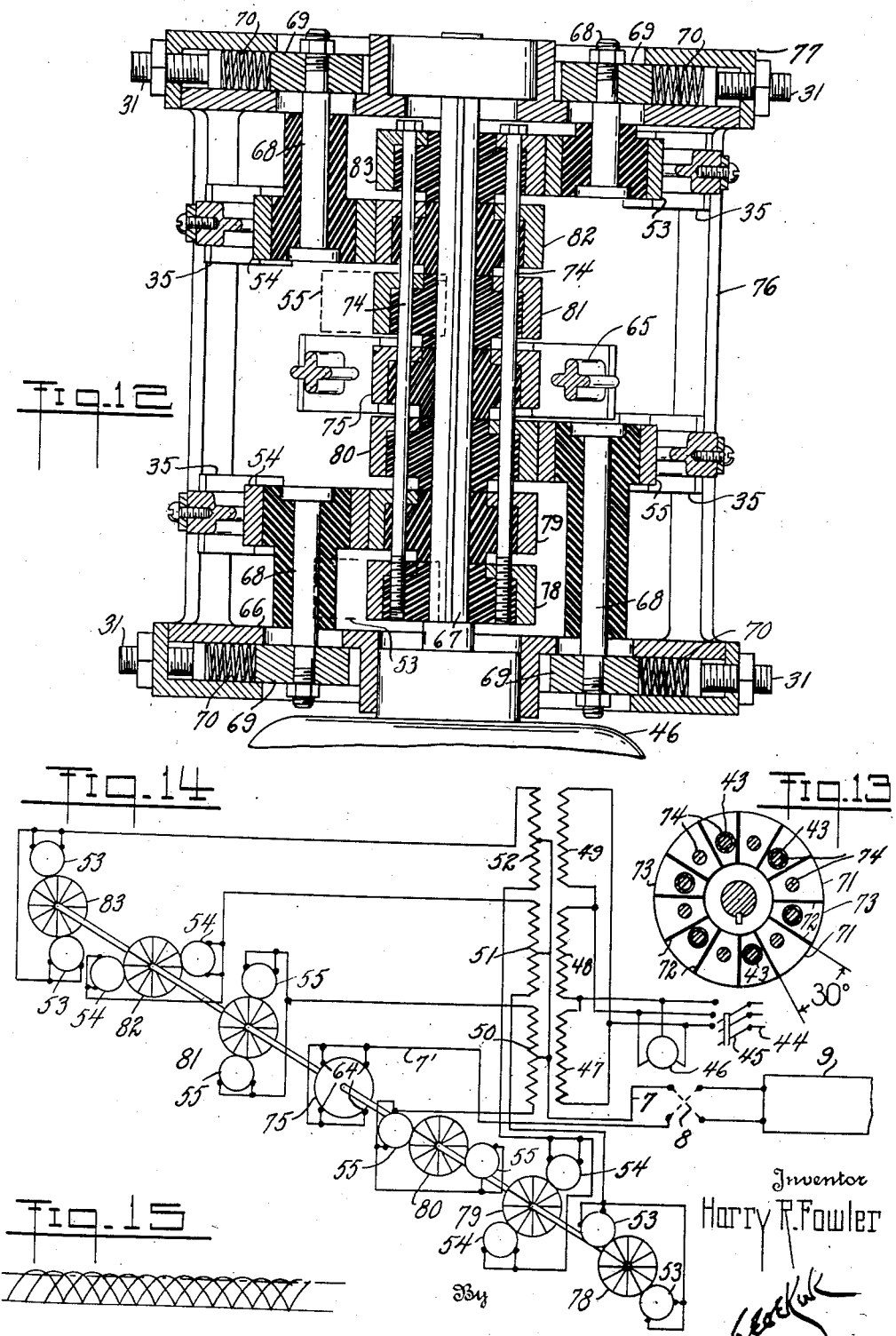

Patented Feb. 22, 1944

2,342,336

UNITED STATES PATENT OFFICE 2,342,336

ELECTRIC CONVERSION

Harry R. Fowler, Toledo, Ohio

Application July 16, 1941, Serial No. 402,675

5 Claims. (Cl. 175—364)

This invention relates to the rectification of alternating current.

This invention has utility in rectifying alternating electric currents by roller contact type commutators in which the tendency toward surging and sparking has been eliminated.

Referring to the drawings:

Fig. 1 is an end elevation, with parts broken away, of the mounting for the rectifier terminals;

Fig. 2 is a section on the line II—II, Fig. 1, with parts broken away, showing other details of the terminals;

Fig. 3 is a section on the line III—III, Fig. 1, showing a detail of the mounting for slip ring brush;

Fig. 4 is a section on the line IV—IV, Fig. 2, showing features of the relation for the roller terminals of the commutator;

Fig. 5 is a diagram of the rectified single phase alternating current in connection with Fig. 1;

Fig. 6 is a wiring diagram for the layout herein;

Fig. 7 is a view similar to Fig. 1, wherein the layout is for three phase instead of single phase as in Fig. 1, but with the relationship for say one-half the cycle of the respective waves;

Fig. 8 is a section on the line VIII—VIII, Fig. 7, showing the relationship between the slip ring and commutators and the mounting therefor;

Fig. 9 is a detail view showing the set-up for one of the commutators as to its roller contact relation, as applied to the modification shown in Fig. 7;

Fig. 10 is a diagram of the rectified polyphase alternating current in connection with Fig. 7;

Fig. 11 is a wiring diagram of the circuits for the rectifier or converter;

Fig. 12 is a view similar to Fig. 8, wherein the three phase alternating current has an intermediate slip ring and there are wiring connections for the opposite lobes of the alternating current;

Fig. 13 is a detail view of one of the commutators of the device of Fig. 12;

Fig. 14 is a wiring diagram of the layout for the circuits of the device of Fig. 12; and Fig. 15 is a diagram of the rectified alternating current in connection with Fig. 14.

Power curent conductor lines 1, 2 (Fig. 6) may energize synchronous motor 3 and coil 4 as a primary. Energized from this coil is a secondary winding having coil sections 5, 6, between which there is conductor line 7 past reversing switch 8 to load 9, which may be a source for continuous or direct current use. The load 9 is, in normal operation, not thrown in or applied until the synchronous motor 3 is up to synchronous speed. Special values herein have arisen in plating, arc work as welding, and in motion picture projection. This secondary winding section 5 has therefrom line 10 with branches 11 and subbranches 12 to brushes 13 abutting or contacting rollers 14, herein shown diametrical or 180° apart in contacting a commutator having active faces 15 (Fig. 4) of maximum arc extent, say herein for taking the two lobes of a single phase current and at a rotating speed of 1800 R. P. M. and 60 cycle single phase alternating current. In making up this commutator, there is additionally narrow insulation 16 of say not to exceed twenty minutes (20') normally, non-conductor commutator face 17 as faced by additional insulation section 16 from the complementary, opposite, or other live conductor face 15 of the commutator. Each of these two faces 15 is of similar maximum arc extent that is, 90°, while the intermediate non-conductor commutator sections 16, 17, 16, make up another 90°.

In the set-up, when the supply lines 1, 2, bring in 220 volt current, one of the sections 5 of the secondary may take off 110 volts and the additional section 6 take off 110 volts, the line 7 from between the sections being such that, as the line 10 from the section 5 supplies positive current to the load, the line 11' from the section 6 may in the succeeding halfcycle have roller 18, 90° from the roller 14, take off the corresponding half cycle of current, but consequently have positive or the same direction of current flow as that taken off from the section 5. It is thus to be seen that these rollers 14, 18, are in parallel. This means that the 180° wave from the coil 5 may be picked up as continuous current section 19 (Fig. 5) and therefrom through the roller 18 from the secondary coil section 6 the succeeding lobe 180° section 20 may be taken. In the practical set-up herein, closing or throwing in of starting switch 21 (Fig. 6) may pick off the sections or lobes of the current for outflow direction. However, in the event such be contrary to the desired direction, as in plating, welding, or even motion picture arcing operations, cure may follow forthwith through an operation of the reversing switch 8.

Structurally in the set-up herein, synchronous motor 3 has shaft 22 (Fig. 2) mounting hub section 23 carrying a commutator having the sections 15, 16, 17. From this hub 23 by means of bolts 24 there may be assembled slip ring 25, The respective rollers 14, 13, are mounted on hubs 26 carried by pins 27 extending to slides 28 as actuated by springs 29 in radial guides 30; the compression of which springs is adjusted by screws 31. These guides 30 are in ring sections 32. These ring sections 32 are fixed with the housing of the synchronous motor 3. The rollers 14, 13, turn or rotate but do not revolve. The brushes 13 have springs 33 (Fig. 1) normally urging these brushes along or out of slide ways 34 into roller contacting position. The slide ways 34 are on frames 35 mounted by screws 36 from the ring 32. The electric current wave section as supplied to the commutator section 15 may pass therefrom by bolts 24 to the slip ring 25 to be taken therefrom by brushes 38 in slide ways 39 (Fig. 3) as actuated by springs 40. These slide ways 39 are mounted in brackets 41 assembled by insulation mounting screws 42 with the ring 32.

In the operation hereunder, the single phase alternating electric current may have one lobe section of the wave taken and, without current interruption, the reverse lobe is taken for current direction continuity due to the fact that the roller 14 as leaving the commutator section 15 does not disestablish its conductivity before the roller 13 establishes on the commutator a flow continuity therefor as to the section 15. The bolts 24 through the inactive section 17 have insulation 43. The placing of the rollers 14 in pairs opposite each other not only means a balancing of the construction but provides for ample capacity rate, and accordingly beyond that which might be apropriate for a single roller with its line contact.

In carrying forward the invention herein, continuity of current flow may be secured by having the spacing segments not in excess of the conductive segments. In practice, this relationship when established with roller contacts as herein disclosed insures a transition from wave to wave without hiatus, interruption, or gap therebetween. As developed hereunder with the single phase current, this transition is against current reversal at the zero or neutral point and may be effective with accuracy. In multi-phase current, say three phase, this transition may be located away from the zero or neutral point, and preferably as well as accurately achieved hereunder at the point of coincident values between the adjacent coincident wave portions. In the event there be a 60 cycle three phase current, the extent of the arcs of the lobes which approximate coincidence may be 120°. Thus the point of location is some 30° away from the neutral or zero line. This experience here, as well as with the single phase, is with avoidance of surge in the line for the load and avoidance of arcing or like disturbance from the transition.

To the end of carrying this practice forward, three phase supply line 44 (Fig. 11) may pass intake switch 45 to start synchronous motor 46 and thence to primary windings 47, 48, 49, with star secondary windings 50, 51, 52, therefrom. These windings extend to pairs of opposite roller terminals 53, 54, 55, at respective commutators 56, 57, 58. These commutators have contact faces 59 of controlling or maximum arc extent as to the adjacent non-conductor faces comprising insulation spacers 60 and inactive spacers 61 therebetween. Slip ring 62 (Fig. 3) may be mounted by bolts 63, this slip ring having its take-off brushes 64 mounted in carrying ring 65 as set up through mounting from ring 66 in the housing of the synchronous motor 46. On shaft 67 of this synchronous motor 46, besides the slip ring 62, there may be mounted the respective commutators 56, 57, 58, with several rollers oppositely or diametrically set. These rollers have their respective mounting pins 68 from slides 69 as actuated by springs 70 in the non-rotary ring frame 66.

In the disclosure herein, Figs. 7 to 10 show the handling of three phase current. The lobes of the sine curves are taken in the relationship of 120° and in but a common direction. In the development of the disclosure herein as to Figs. 1 to 6, the sine curve was taken as to the lobes in the opposite direction off the full length of the curve. Accordingly, in adapting the invention herein to a multiphase current, say three phase for opposite direction of the lobes, the extent of current take-off rectification herein may be limited to the lobe section tips, say of 60° electrical extent (Fig. 15) with the transition at the common value region as achieved hereunder by the full extent commutator section 71 (Fig. 13). The adjacent commutator regions are made up of insulation portions 72, inactive spacer 73, and insulation portion 72, so that the two portions 72 and the spacer 73 therebetween do not exceed the face or arc extent of the active or conductor commutator portion 71. These conductor commutator portions 71 have connection through bolts 74 to slip ring 75 for the build-up herein, wherein the frame 66 has extension 76 to additional non-rotary ring portion 77. This permits the mounting of commutators 78, 79, 80, from the frame ring 66 and commutators 81, 82, 83, from the frame ring 77.

With the single phase 60 cycle, the instance as disclosed is for 1800 R. P. M. In the event the speed were 3600 R. P. M., the commutator would be 180° for the live segment instead of 90°. This would give the balanced structure with two rollers in parallel by successively operating from the common live segment of the commutator. In the event there be 1800 R. P. M. the structure might be with two rollers disposed at 90° on a four part commutator. However, the preferred form for balanced structure is as shown of four rollers. There is thus taken into account various speeds for 60 cycle single phase of 3600 R. P. M. or 1800 R. P. M. Adaptation may be therefrom with 1200 R. P. M. with six part commutator and six rollers for three of said six rollers to be in parallel. With the speed at 900 R. P. M., the commutator would be of eight parts, for four rollers in parallel in their succession of conductor operation as analogous to the two rollers in 3600 R. P. M. With four rollers in this 900 R. P. M., there is no occasion for doubling to balance the construction as appropriate in the 1800 R. P. M. for four rollers. With the 1200 R. P. M. there may be three or six rollers. In the determining of the direction for load current flow through the reversing switch, in practice such may be maintained for desired relative position at the rolling contact, thereby prolonging the life of the roller as against conductor disintegration.

In the practice herein, there is a degree of nicety in establishing the original placement or adjustment of the angular position of the roller as to the live segment. Once this is established, this position need not be changed. The pairs of brushes 32 for the contact terminal rollers are in duplication for balanced structure advantage.

In the disclosure herein, the structure permitting selection of the portions of the wave lobes for continuous current conductor may be varied even to the extent that the lobe portion be picked up for its entire extent. Conversely there may be the taking on of the lobe at its high point and discontinuance at a lower point or at zero or neutral. This latter mode of operation has value in certain welding or plating operations.

There is efficiency not only in the use of current as only the portion taken from the lobes or the waves is used, but in the circuit therefor, to the end that the line contact of the roller is effective is thereby completing the circuit, with a minimum of internal resistance in such circuit. The length of the line, of course, may be for a single roll or a plurality of rolls as shown in the disclosure.

Furthermore, in the utility herein, the secondary coil as the take-off from the supply source gives a circuit independent of such source and disturbances therefrom. It permits the taking of supply energy in a way even against unbalancing the supply circuit for the coil ratio may be determined as a sort of transformer according to the particular demands which may be as discussed from 220 volts down to 110 volts or even in other relationships up or down.

In the use of the transformer, the secondary, as shown in Fig. 6, may have the common or neutral line 7 as the feature in the set-up. This permits the single line contact roller for working in the lobe or phase selection for maintaining direct circuit. Due to the roller establishing a pick up of current from the succeeding wave section before or momentarily before there is dis-established the current take-off preceding wave section, this current continuity is without break.

In the instance (Figs. 5, 6) wherein single phase is used, there is no voltage for current disturbance at the switch-over from one lobe to a succeeding lobe of the wave. This transition (Figs. 10, 15) may be at the point of common value between the succeeding wave and its predecessor. This transition at the common value region insures against current disturbance and assures the continuity for the rectified current.

The disclosure herein, as to the advantage of the control line contact being but one in the continuous or converted circuit, has as its value for a similar dimension roller, a reduction of such restriction to one-half when the rollers are in duplicate and in parallel. On the basis of 1800 R. P. M., in the event there be a reduction of the speed say to 900 R. P. M. and the take-off be accordingly with four rollers in parallel, this means there is one-fourth the constriction or capacity retarding factor involved in this converted or resulting current. Taking these elements into account as to having, say, a converted current with rollers in series (Patent No. 2,220,897, November 12, 1940), this means that the single roller in this disclosure is one-quarter; the pair of rollers, one-eighth; and the four roller set-up one-sixteenth as to the capacity of restriction line roller contact of the patent.

In the feature herein disclosed as to the range for selecting or picking out a portion of a lobe or wave, when such is descending, say to neutral or zero, there is a definite letting go of the used impulse, whether or not the succeeding wave section or lobe portion be directly next taken out or there be a more or less minute interval therefor. This definite release to neutral or zero thereby has values against disturbances in some practices.

What is claimed and it is desired to secure by Letters Patent is:

1. A source of alternating electric current, a primary winding energized thereby, a secondary winding having first and second coil sections, a load, a center connection for unidirectional current between the secondary winding and the load, there being conductor means directly connected between the center connection and the load at all times, a distributor, a drive for the distributor in synchronism with the source of alternating current, a first diametrically disposed pair of roller terminals in mechanically balanced relation for the distributor responsive to said drive to provide uniform contact means directly thereto from a point on the first coil remote from the center connection, a second diametrically disposed pair of additional roller terminals in mechanically balanced relation and angularly spaced from the first pair for the distributor having conductor means directly connected to a point on the second coil section remote from the center connection to thereby connect the first and second pair of roller terminals alternately between the load and the distributor.

2. A source of alternating electric current, a primary winding energized thereby, a secondary winding having first and second coil sections, a load, a center connection from between the coil sections, there being conductor means directly connected between the center connection and the load at all times, a distributor, a drive for the distributor in synchronism with the source of alternating current, a first diametrically disposed pair of roller terminals in mechanically balanced relation for the distributor having conductor means provided with a brush connection directly thereto from a point on the first coil remote from the center connection, a second diametrically disposed pair of additional roller terminals in mechanically balanced relation and angularly spaced from the first pair for the distributor having conductor means provided with a brush connection directly thereto from a point on the second coil section remote from the center connection to thereby connect the first and second pair of roller terminals alternately between the load and the distributor, and conductor means from the distributor to the load including slip ring means for direct current in series with the load and center connection.

3. A source of electric current, a distributor having in annular series a pair of arc extent conductor segments and alternating therewith spacings of similar equal arc extent, separate mechanically balanced pairs of diametrically disposed roller terminals, a drive for effecting relative travel between the terminals and distributor for contacting said pair of conductor segments in providing uniform contact means, and a load having connection alternately thru different pairs of roller terminals with the distributor.

4. A source of alternating electric current, a rotary distributor, mechanically balanced diametrically disposed pairs of contacting rollers at the distributor, a drive for the distributor in synchronism with the source of alternating current, said distributor having conductor segments of extent approximating the spacing between adjacent rollers, respective spacings of non-conductor arc segments similar to the conductor segments and alternating therewith, mounting means positioning the rollers at said segment extent spacing so that the succeeding roller enters conducting contact with another segment at the voltage the preceding roller has on leaving its segment, and conducting means to and from each pair of rollers for unidirectional current.

5. In combination, an alternating electric current circuit including first and second coils and a center connection therebetween, a direct current circuit, and a conversion apparatus interconnecting said circuits, said apparatus including circuit interrupting means comprising a rotary distributor having a plurality of pairs of segments embodying conducting segments of the extent of the spacing therebetween, direct connections from a pair of segments to the direct current circuit, additional connections successively completed without overlap from the pair of segments alternately to the first and second coils at points remote from the center connection, said additional connections including mechanically balanced pairs of diametrically disposed rollers having segment extent spacing therebetween, and mounting means positioning the rollers to contact singly the respective segments.

HARRY R. FOWLER.